Figure 1:
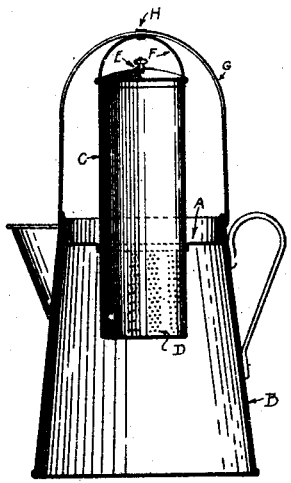

G. H. NICHOLLS.
COMBINATION STEEPER AND DRIPPER.
APPLICATION FILED MAY 17, 1920.

1,365,185.

Patented Jan. 11, 1921.

WITNESSES:

C. E. Franov.

INVENTOR
GEORGE HABBERTON NICHOLLS

BY
ATTORNEY

UNITED STATES PATENT OFFICE.

GEORGE HABBERTON NICHOLLS, OF BEAUMONT, TEXAS.

COMBINATION STEEPER AND DRIPPER.

1,365,185.  Specification of Letters Patent.  Patented Jan. 11, 1921.

Application filed May 17, 1920. Serial No. 381,889.

*To all whom it may concern:*

Be it known that I, GEORGE H. NICHOLLS, a citizen of the United States, and a resident of Beaumont, in the county of Jefferson and State of Texas, have invented new and useful Improvements in Combination Steepers and Drippers, of which the following is a specification.

My invention is an improvement in combination steepers and drippers, and has for its object to provide a steeper and dripper of the character specified, adapted for use in making tea or coffee, wherein a perforate container is provided for tea or coffee which is slidably connected with the pot at the axis thereof, to move vertically to permit the tea or coffee to be supported in the water in the pot or out of the water.

Figure 2:
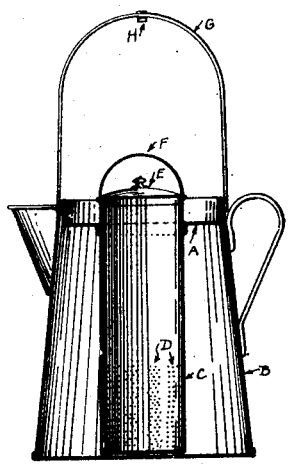

In the drawings:

Figure 1 is a vertical section through the pot with the container in elevated position, Fig. 2 is a similar view with the container in lowered position.

In the present embodiment of the invention, the pot B is of usual construction, having the usual handle and spout, and the pot is provided with a cover A having at its center an opening. The cover as shown is cup shaped and drops down into the top of the pot, the cover having means for engaging the edge of the pot to limit the downward movement of the cover.

The central opening of the top A is provided with a depending flange, and the container C which is of approximately the same depth as the depth of the pot is mounted to slide through this opening, being of smaller diameter than the top of the pot. The container has perforations D at its lower end, and it has a cover E which as shown is provided with a knob for convenience in manipulating the same.

A bail F is also provided, being connected with the container at the top thereof, and by means of this bail the container may be moved vertically through the lid. A bail G is also connected with the body at the top, and this bail as shown is of considerable height extending well above the top of the pot. The bail carries a hook H which is adapted to be engaged by the bail F to support the container in the position shown in Fig. 1, that is, in elevated position, with the coffee or tea in the container out of the water in the pot.

The cover A and the cover E fit their respective vessels tightly, and the container C fits the opening through the cover snugly, so that there is no escape of heat.

In operation, the tea or coffee is placed in the container and boiling water is poured on the material and allowed to percolate down into the pot, the container being supported in the position of Fig. 1. The container may then be lowered by means of the bail F into the pot, and the tea or coffee permitted to steep.

After the coffee or tea has steeped, the container is raised and supported by the hook H, permitting the fluid to flow into the pot. This process may be repeated as often as may be necessary to extract the full strength of the material.

With the ordinary dripper, a very slow pouring of water on the coffee is necessary in order to permit percolation. If the water is poured quickly it passes around the particles of coffee, washing from the outside only a portion of the soluble constituent, and to obtain full strength, the water must be repoured often.

In small inclosed containers which are placed inside the vessel, the extraction is incomplete, because ground coffee is very buoyant and will float. The water sucks into but does not pass through the coffee powder, and the soluble matter is not dissolved. In the standard percolator with the coffee in the upper part of the vessel, and water driven by superheat to ascend and pass repeatedly through the ground coffee thorough extraction is obtained at the loss of aroma and volatilization of the coffee. With the present device, the whole operation may be thorough and controlled to the desired result without loss of quality or time in preparation, and it is so designed as to be easily cleaned and kept sanitary.

I claim:—

1. A device of the character specified, comprising a vessel having a close fitting cover provided with an opening, and a perforate container mounted to slide in the opening, and of approximately the same depth as the vessel, said container having a bail, and the vessel having also a bail provided with a hook for engaging the bail of the container to support the same in elevated position for the purpose specified, the container having a tight fitting cover and fitting closely the opening through the cover of the vessel.

2. A device of the character specified, comprising a vessel having a close fitting cover provided with an opening, and a perforate container mounted to slide in the opening, and of approximately the same depth as the vessel, said container having a bail, and the vessel having also a bail provided with a hook for engaging the bail of the container to support the same in elevated position for the purpose specified.

3. In a device of the character specified, a vessel having a close fitting cup shaped cover and provided at its center with an opening having a depending marginal flange, and a perforate container mounted to slide in the opening, and having a bail, the vessel having means for engaging the bail of the container to support the same in elevated position.

GEORGE HABBERTON NICHOLLS.